United States Patent
Uroz et al.

(10) Patent No.: US 7,450,266 B2
(45) Date of Patent: Nov. 11, 2008

(54) COLOR CAST REDUCTION SYSTEM AND METHOD

(75) Inventors: Juan Uroz, Terrassa (ES); Johan Lammens, Barcelona (ES); Jacint Humet Pous, Barcelona (ES); Michel Encrenaz, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 961 days.

(21) Appl. No.: 10/376,447

(22) Filed: Feb. 28, 2003

(65) Prior Publication Data

US 2004/0169871 A1 Sep. 2, 2004

(51) Int. Cl.
- H04N 1/407 (2006.01)
- H04N 1/58 (2006.01)
- G06K 15/02 (2006.01)
- G06K 9/00 (2006.01)

(52) U.S. Cl. ............... 358/1.9; 358/3.21; 358/3.23; 358/521; 358/3.27; 382/162; 382/167

(58) Field of Classification Search ......... 345/589–591, 345/604; 358/1.9, 515–516, 518–520, 522, 358/296, 406, 1.16, 3.21, 3.23, 521, 3.27; 382/167, 162; 348/223, 602, 649, 655; 347/115, 347/900; 399/16

See application file for complete search history.

(56) References Cited

U.S. PATENT DOCUMENTS

| | | | |
|---|---|---|---|
| 5,172,224 A * | 12/1992 | Collette et al. ............... 358/515 |
| 5,276,779 A | 1/1994 | Statt | |
| 5,420,704 A * | 5/1995 | Winkelman ................. 358/520 |
| 5,532,848 A | 7/1996 | Beretta | |
| 5,612,902 A | 3/1997 | Stokes | |
| 5,754,448 A | 5/1998 | Edge et al. | |
| 5,754,682 A | 5/1998 | Katoh | |
| 5,872,895 A | 2/1999 | Zandee et al. | |
| 5,920,358 A | 7/1999 | Takemura | |
| 5,995,653 A | 11/1999 | Reed et al. | |
| 6,037,950 A | 3/2000 | Meir et al. | |
| 6,075,614 A * | 6/2000 | Ohtsuka et al. ............. 358/1.1 |
| 6,075,888 A | 6/2000 | Schwartz | |
| 6,377,702 B1 * | 4/2002 | Cooper ....................... 382/167 |
| 6,414,690 B1 | 7/2002 | Balasubramanian et al. | |
| 6,459,436 B1 * | 10/2002 | Kumada et al. ............. 345/590 |
| 6,469,805 B1 * | 10/2002 | Behlok ....................... 358/1.9 |
| 6,577,395 B1 * | 6/2003 | Berns et al. ................. 356/402 |
| 7,027,067 B1 * | 4/2006 | Ohga et al. ................. 345/589 |
| 7,034,960 B2 * | 4/2006 | Stone et al. ................. 358/1.9 |
| 7,053,910 B2 * | 5/2006 | Newman .................... 345/604 |
| 2002/0180755 A1 * | 12/2002 | Krueger ...................... 345/601 |

\* cited by examiner

*Primary Examiner*—Edward L Coles
*Assistant Examiner*—Charlotte M Baker (57) ABSTRACT

In one embodiment, a print system includes an anticipated ambient lighting selector to allow selection of an anticipated ambient lighting. A rendering module is configured to map a print job into raster data configured to reduce color cast in gray output when displayed under the anticipated ambient lighting.

20 Claims, 5 Drawing Sheets

COLOR CAST REDUCTION SYSTEM AND METHOD

BACKGROUND

In some printers, gray output is produced by application of a mixture of colored inks, such as a mixture of cyan, magenta and yellow (CMY) inks. Where the application is successful, the output will appear neutral, i.e. the human eye will not perceive color. Unfortunately, "metamerism" is a phenomenon wherein the perceived hue of a given color changes with the type of illumination. This effect is particularly noticeable in the case of gray or near gray colors since the human threshold of perception of color difference is lower for gray or near gray colors than for more chromatic colors.

Some printers, such as "proofers" used in the commercial printing industry, may create output associated with a given lighting. Unfortunately, when the print output is viewed under different lighting conditions, metamerism operates to cause grays to appear to contain elements of color (i.e. a "color cast"). Accordingly, the output may vary from that which was intended, due to lighting conditions.

SUMMARY

In one embodiment, a print system includes an anticipated ambient lighting selector to allow selection of an anticipated ambient lighting. A rendering module is configured to map a print job into raster data configured to reduce color cast in gray output when displayed under the anticipated ambient lighting.

BRIEF DESCRIPTION OF THE DRAWINGS

The following detailed description refers to the accompanying figures. In the figures, the left-most digits(s) of a reference number identifies the figure (FIG.) in which the reference number first appears. Moreover, the same reference numbers are used throughout the drawings to reference like features and components.

Figure 1:
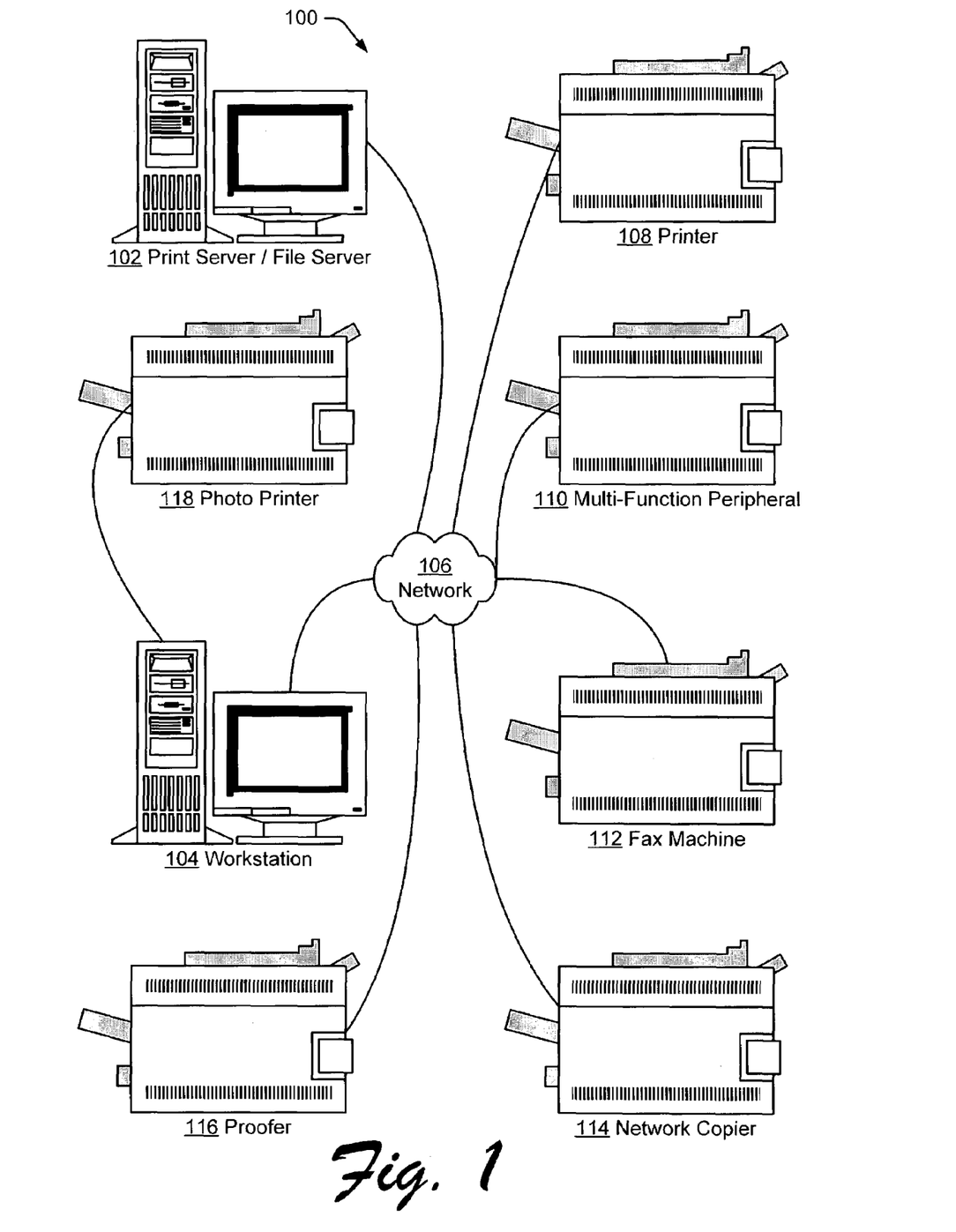
FIG. 1 is an illustration of an exemplary print environment wherein a color cast reduction system and method for color and grayscale printed output may be configured.

DETAILED DESCRIPTION shows a network environment 100 in which an exemplary print system and method for reduction of color cast in color and grayscale printed output may operate. A print server or file server 102 is configured to receive a print job, from any of a plurality of workstations 104. The print server 102 may communicate over a network 106 to any type of imaging device, such as a printer 108, multifunctional peripheral 110, fax machine 112, network copier 114, printing industry type proofer 116, home photo printer 118, or other printing or imaging device.

Figure 2:
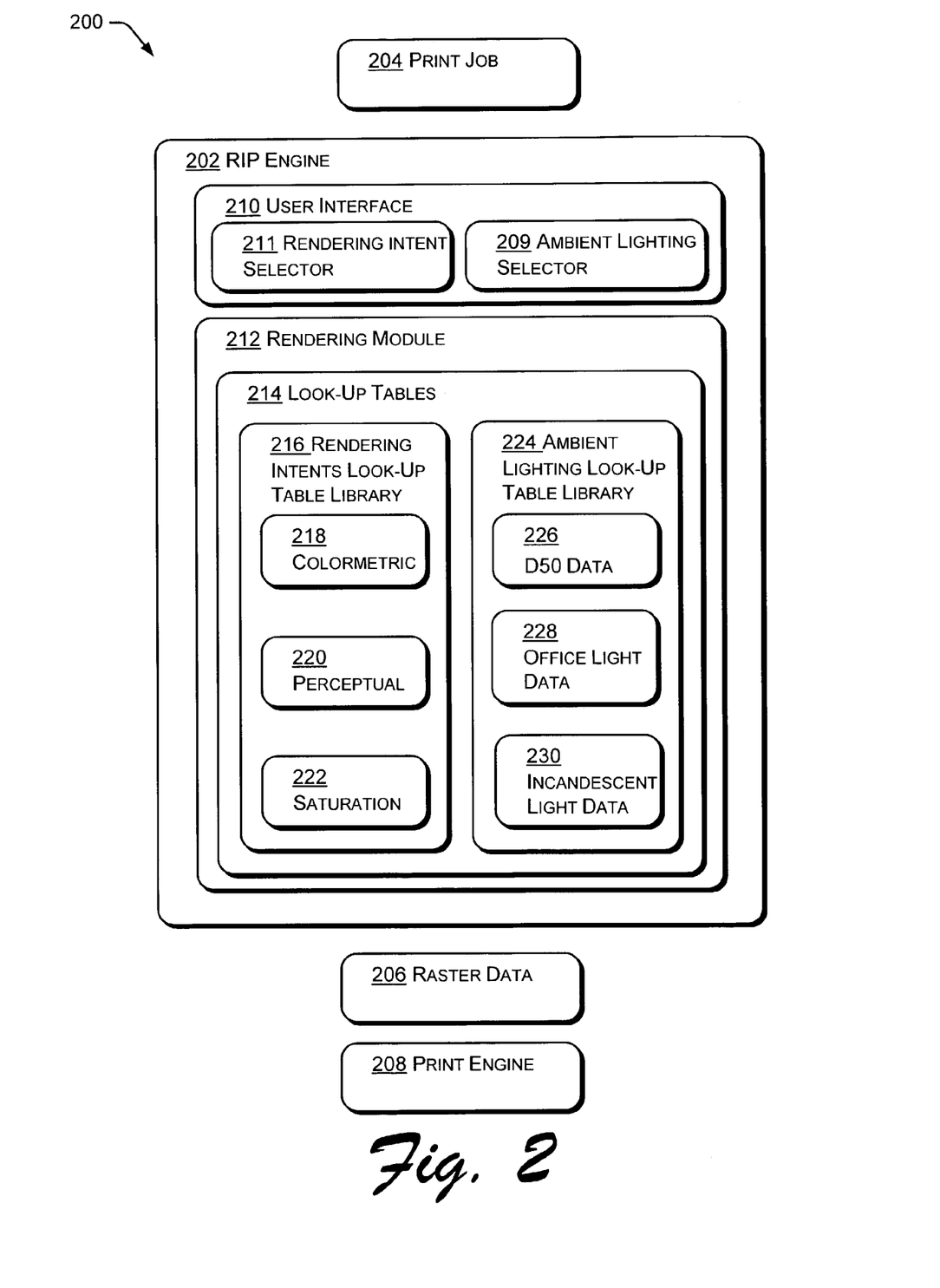
FIG. 2 is a block diagram that illustrates an exemplary print system which reduces color cast in color and grayscale printed output.

FIG. 2 shows an exemplary print system 200, containing an exemplary RIP (raster image processing) engine 202. The RIP engine 202 may be located on the print server 102 (FIG. 1), on a printer 108 (FIG. 1) or other location, as desired. The RIP engine 202 is configured to receive a print job 204 and to output raster data 206 for consumption by a print engine 208.

The exemplary RIP engine 202 includes a user interface 210 having a rendering intent selector 211 which allows selection of a preferred rendering intent. A rendering intent involves a method of mapping color data under specific rules to obtain desired results. For example, known rendering intents include "colormetric," "perceptual" and "saturation". Selection of a specific rendering intent may be made to achieve desired results. For example, selection of the "perceptual" rendering intent is preferred when the output involves photographs, and selection of the "saturation" rendering intent is preferred when the output involves business graphics.

A first embodiment of the rendering intent selector 211 may prompt the user to directly indicate a desired rendering intent. For example, the user may operate the user interface 210 to select colormetric, perceptual or other rendering intent, as desired. A second embodiment of the rendering intent selector 211 may be configured to receive information about the user's selection of an expected ambient lighting and to thereby automatically select a rendering intent which has been pre-associated with the selected ambient lighting. For example, where the user selects D50 lighting, the second embodiment of the rendering intent selector 211 may operate to automatically select the colormetric rendering intent due to a previous association between D50 lighting and colormetric rendering. A third embodiment of the rendering intent selector 211 may be configured to include combined elements of the first two embodiments. For example, where the user has selected D50 lighting, the third embodiment of the rendering intent selector 211 may operate to automatically select colormetric rendering intent. However, where incandescent lighting is indicated by the user, the third version of the rendering intent selector 211 may wait for user input from the user interface 210 to indicate the desired rendering intent.

The exemplary user interface 210 also includes an ambient lighting selector 209 which allows selection of an anticipated ambient lighting, wherein the anticipated ambient lighting reflects the lighting under which it is anticipated that the print output will be viewed. For example, known ambient lighting includes "D50," "office lighting" (e.g. florescent lighting) and "incandescent". Selection of an anticipated ambient lighting allows for corrections to be made to gray and near-gray output, thereby reducing the tendency of such output to have an unwanted color cast when viewed under the anticipated ambient lighting. For example, selection of the "incandescent" ambient lighting is preferred when the output will be viewed under such lighting, since such a selection results in operation of the incandescent ambient lighting look-up tables 230 (described below) to reduce the color cast of gray and near gray output when the output is viewed under such lighting conditions.

A first embodiment of an ambient lighting selector 209 automatically selects—without user action—an ambient lighting which was previously associated with a rendering intent which has been previously selected. For example, if D50 lighting and the colormetric rendering intent have previously been associated, then selection of the colormetric rendering intent will automatically result in selection of the D50 ambient lighting by the first embodiment of the ambient lighting selector 209. Where the D50 ambient lighting and the colormetric rendering intent have been selected, corresponding look-up tables will be selected from the libraries 216, 224, respectively, as will be seen in greater detail below.

A second embodiment of the ambient lighting selector 209 allows the user to select an anticipated ambient lighting independently from the user's choice of rendering intents. For example, the user may be allowed to select from a variety of anticipated ambient lighting types, such as D50, office light, incandescent light and/or other lighting types regardless of the selected rendering intent. A third embodiment of the ambient lighting selector 209 combines the first two embodiments, wherein selection of one or more rendering intents results in automatic selection of an anticipated ambient lighting, while selection of other rendering intent(s) may result in the ambient lighting selector 209 waiting for user input to select the anticipated ambient lighting through the user interface 210.

A rendering module 212 is configured to map information contained within in a first color space into data in a second color space. For example, an exemplary rendering module 212 is configured to map input data formatted in a page description language (PDL) such as PostScript® and contained within the print job 204 into output in the form of raster data 206 required by the print engine 208.

A preferred rendering module 212 facilitates color data mapping using a variety of rendering intents. Rendering intents provide a means by which color data can be mapped under the constraint of a predefined set of gamut mapping rules, to result in an expected, desired and/or standardized output. The rules can be officially sanctioned, such as by ICC standards, or can be arbitrarily formed. For purposes of discussion, three rendering intents are seen in FIG. 2: colormetric, perceptual and saturation. Colormetric is typically associated with "proofers" used in the printing industry in applications where it is desired that the reproduction should match the original; the perceptual rendering intent is utilized to obtain pleasing reproduction and is frequently used for photographic output; and the saturation rendering intent is typically used to obtain bold graphics.

In one implementation, the rendering module 212 employs look-up tables 214 to map a print job 204 in PDL into raster data 206. Alternatively, an algorithm may be used to perform similar functionality. Where look-up tables are used, look-up tables may be selected from a rendering intents look-up table library 216 to perform gamut mapping according to the desired rendering intent of the user. For example, if the user has selected a rendering intent of "colormetric," "perceptual" or "saturation" by operation of the rendering intent selector 211 and/or the user interface 210, the colormetric, perceptual or saturation look-up tables 218, 220, 222, respectively, will be selected by the RIP engine 202. Accordingly, during the rendering process, data will be gamut-mapped using the look-up table 218-222 associated with the selected rendering intent.

Additionally, an ambient lighting look-up table library 224 may be provided. The ambient lighting library 224 may contain additional look-up tables containing gray neutralization data specific to different lighting conditions. Application of a look-up table within the library 224 reduces the color cast in gray or near gray output when viewed in the lighting conditions associated with the look-up table. Such reduction may be accomplished by replacement of gray and near gray colors with similar gray and near gray colors which, under the anticipated ambient lighting, have the intended gray or near gray color, as determined by experimentation, calculation or other means. Thus, the ambient lighting look-up tables typically do not operate over the entire gamut mapped by the rendering intent look-up tables.

In the implementation of FIG. 2, three ambient lighting look-up tables 226, 228 and 230 are provided within the ambient lighting look-up table library 224. Each ambient lighting look-up table is associated with a lighting condition; in particular, ambient lighting look-up tables 226, 228, 230 may be associated with D50 light, florescent office light and incandescent light, respectively. In other embodiments, an alternative group of ambient lighting look-up tables could be used, wherein the look-up tables included are associated with different lighting condition. Such lighting conditions may include one or more standard lighting conditions such as D50 or one or more non-standard lighting conditions, or a combination of the two types.

Figure 3:
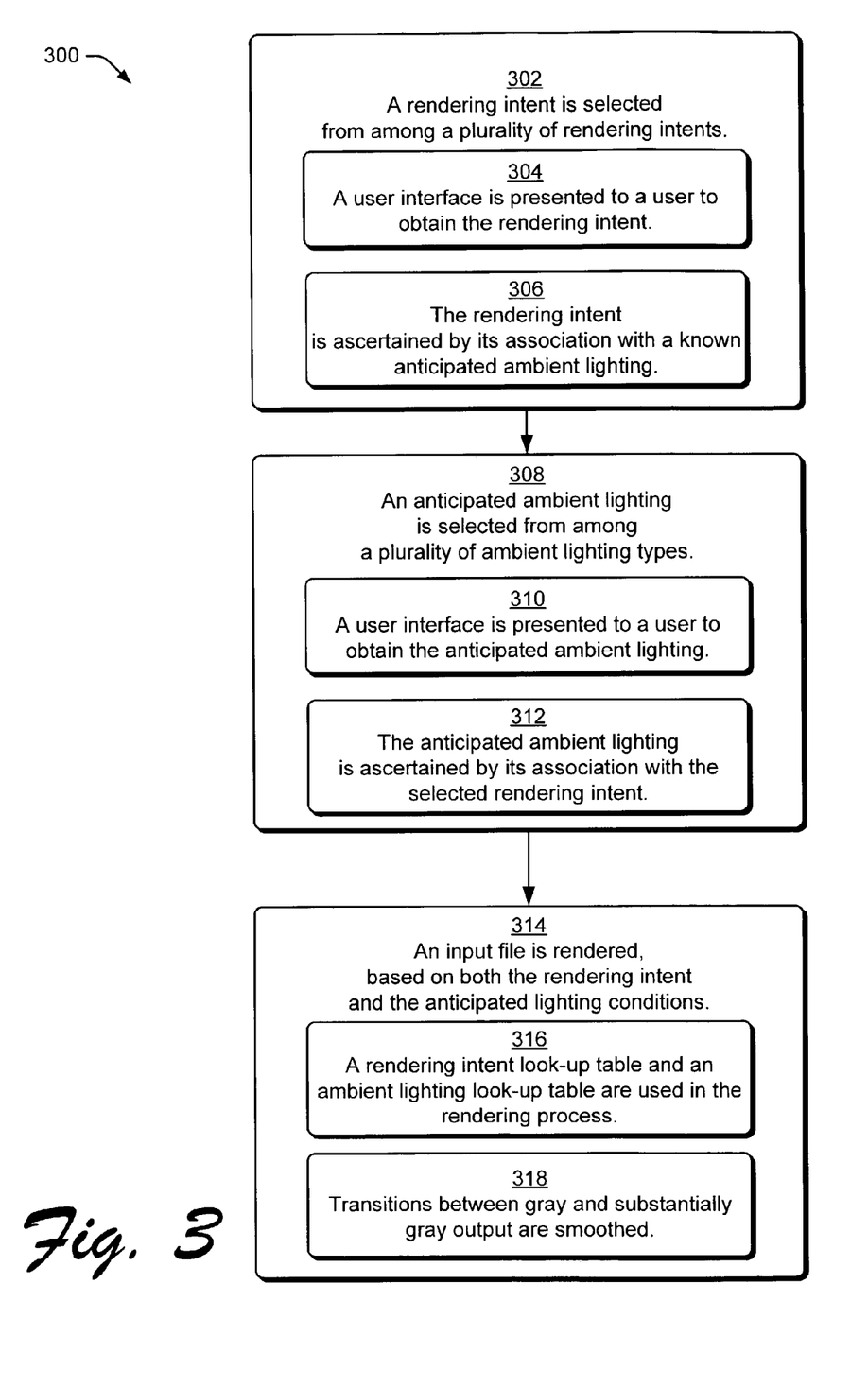
FIG. 3 is a flow diagram that describes an exemplary method to reduce color cast in color and grayscale printed output.

The flow chart of FIG. 3 illustrates a further exemplary implementation, wherein a method 300 is employed to map input data—such as PDL commands within a print job 204—into raster data 206 to drive a print engine 208. The selection of a rendering intent and an anticipated ambient lighting provide control over the data mapping process from print job 204 to raster data 206. In particular, selection of a rendering intent allows the user to exercise some control over the appearance of the output. Additionally, selection of an anticipated ambient lighting condition allows reduction of color cast in gray and near gray output when viewed under the lighting conditions associated with the anticipated ambient lighting.

At block 302, a rendering intent is selected from among a plurality of rendering intents. The rendering intent selection may be made by operation of the rendering intent selector 211 or by operation of another hardware or software structure, module or procedure. At block 304, the selection of the rendering intent may be made directly by a user. Such a selection may be facilitated by use of the first embodiment of the rendering intent selector 211, as previously discussed. In an exemplary configuration, the rendering intent may be selected from among colormetric, perceptual and saturation rendering intents, but the selection could alternatively be made from among different or additional standard and non-standard rendering intents. Alternatively, at block 306 the rendering intent is ascertained by its association with a known anticipated ambient lighting. Such a selection may be facilitated in an automatic manner—without intervention by the user—such as by use of the second embodiment of the rendering intent selector 211, as previously discussed.

At block 308, an anticipated ambient lighting is selected from among a plurality of ambient lighting types. The anticipated ambient lighting selection may be made by operation of the ambient lighting selector 209 or by operation of another hardware or software structure, module or procedure. The ambient lighting selected is the ambient lighting which is anticipated to be present when viewing the print output. In an exemplary configuration, the anticipated ambient lighting may be selected from among D50, florescent office lighting, incandescent lighting, but the selection could alternatively be made from among different or additional anticipated ambient lighting types.

Blocks 310 and 312 are representative of exemplary methods by which the anticipated ambient lighting is selected. At block 310, the second embodiment of the ambient lighting selector 209 allows the user to freely select any desired anticipated ambient lighting, typically through the user interface 210. As seen above, the user is typically allowed to select D50, florescent, incandescent and/or other anticipated ambient lighting types. In an alternative seen at block 312, the ambient lighting type is ascertained automatically by its association with the selected or default rendering intent. Thus, each rendering intent may be associated with an anticipated ambient lighting, such as by operation of the first embodiment of the ambient lighting selector 209, as previously discussed. For example, the colormetric rendering intent may be pre-associated with D50 lighting; accordingly, selection of the colormetric rendering intent automatically results in the selection of D50 lighting by the ambient lighting selector 209, due to the pre-association.

At block 314, an input file is rendered based in part on the selected rendering intent and on the anticipated ambient lighting conditions. As a result, the appearance of color within gray output is less noticeable in the anticipated lighting conditions than in other lighting conditions. Accordingly, metamerism is reduced. Additionally, the rendering process results in the output of gray and/or near gray colors which are "smoothed" to avoid the appearance of excessively rapid or gradual color changes across part of the spectrum. Smoothing transitions may be performed by gradually reducing an extent to which gamut mapping—intended to reduce the color cast of gray output under specific lighting conditions—is applied to near gray output as the near gray output becomes more chromatic, i.e. as a function of the degree of intended color within the near gray output. That is, a smoothing function reduces an extent to which near gray output is neutralized—to reduce color cast under the anticipated lighting—as a function of the chromatic content of the near gray output. As a result, where the rendering of a print job 204 such as a PDL document into raster data 206 was based on a perceptual rendering intent and an anticipated lighting condition involving of incandescent light, the appearance of color would be reduced when viewing the output of the print engine 208 in incandescent lighting conditions corresponding to those for which the incandescent ambient lighting correction has been designed. In particular, the look-up tables associated with incandescent and office lighting may—unlike D50 lighting, which is a standard—vary somewhat according to the nature of the lighting for which the look-up tables are intended to optimize output. In an exemplary rendering process, a print job 204 may be rendered by a RIP engine 202 or mapping module 212 to result in output in the form of raster data 206 that was mapped using selected color mapping rules. These rules are arranged to render or map the input color data to the output color space while conforming to a selected rendering intent. At the same time the rules are arranged to modify the color values of gray or near gray colors in the output data such that they exhibit a reduced color cast when viewed under a pre-selected illumination type.

As seen in block 316, an exemplary rendering process may be performed by use of one rendering intent look-up table and one ambient lighting look-up table, such as those found in the look-up table libraries 216, 224, respectively. Alternatively, a single LUT combining the functions of these look-up tables may be used. Other processing techniques could be substituted where desired.

The operation of an exemplary rendering intent look-up table and one ambient lighting look-up table may be understood by way of example. The rendering intent look-up table 218-222 contains CMY values for the color gamut which can be printed by the printer. The ambient lighting look-up table 226-230 contains CMY values which may be associated with selected colors (grays and near grays) present in the rendering intent look-up table. The CMY values in the ambient lighting look-up table may be used to modify the corresponding values held in the rendering intent look-up table (typically by incremental addition to, or subtraction from, one or more values). As an example, an exemplary gray or near gray CMY value output from the rendering intent look-up table may be defined by C=0.1, M=0.1 and Y=0.1. An exemplary application of the ambient lighting look-up table may result in a modifier applied to these values to result in output values including C=0.1, M=0.1 and Y=0.07.

At block 318, the rendering process seen in block 314 may be extended to apply a gray neutrality correction to near gray colors as well as gray colors in a manner which results a smoothed transition between gray, substantially grey and non-gray output. This gray neutrality correction may be applied progressively less to colors that have increased hue. By using such a "smoothing function" the transition in hue change between gray colors and near gray colors in the printed output may be made to appear substantially continuous.

For example, a look-up table from the ambient lighting look-up table library 224 may be used to modify a first (gray or near gray) color value output from a rendering intent look-up table and in so doing ensure that when that particular color value is printed on a given printer, it will appear more neutral under an anticipated lighting. The same ambient lighting look-up table may be used to modify substantially gray colors (i.e. output of the rendering intent look-up table with a slight color cast) in a manner which smooths transitions between gray and substantially gray output and reduces the appearance of unaesthetic lines in the output. Accordingly, transitions between gray and substantially gray output are smoothed.

Figure 4:
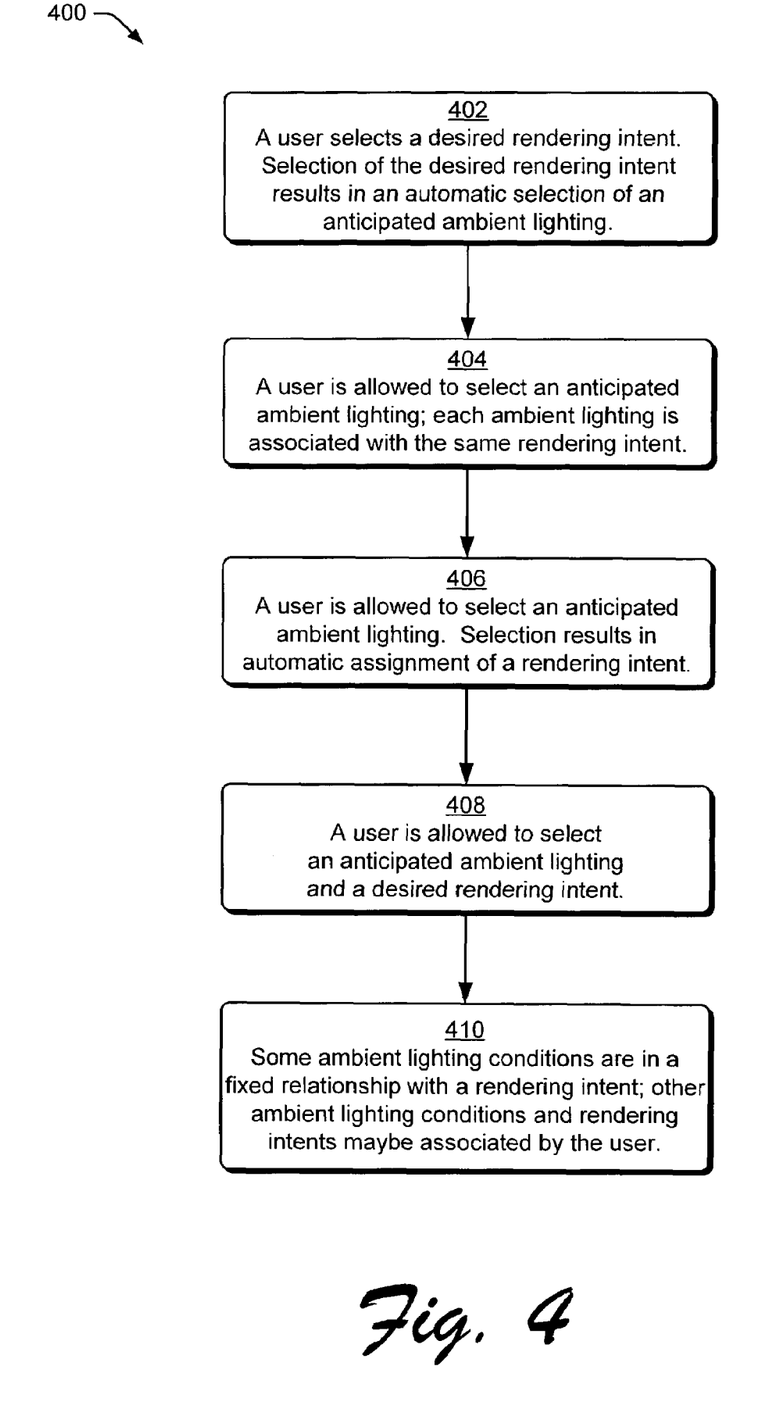
FIG. 4 is a flow diagram that describes an exemplary method for operation of an ambient lighting selector.

The flow chart of FIG. 4 illustrates an exemplary method 400 by which the user interface 210, the ambient lighting selector 209 and the rendering intent selector 211 may be operated. While five exemplary blocks are illustrated, the user interface 210, the ambient lighting selector 209 and the rendering intent selector 211 could be implemented in a manner consistent with one or more of the blocks.

At block 402, a user selects any available desired rendering intent using the user interface 210, such as by operation of the first embodiment of the rendering intent selector 211, as previously described. Selection of the anticipated ambient lighting results in an automatic manner by operation of an ambient lighting selector 209—such as the first embodiment of the ambient lighting selector 209, as previously discussed. Thus, the designer of the print system may configure it to pre-associate each rendering intent with an anticipated ambient lighting condition in a manner thought to be appropriate. For example, selection by the user of the colormetric rendering intent may automatically result in selection of the D50 anticipated ambient lighting, by operation of the first embodiment of the ambient lighting selector 209.

At block 404, a user is allowed to select an anticipated ambient lighting, such as by operation of the second embodiment of the ambient lighting selector 209, as previously discussed. In the embodiment of block 404, only one rendering intent is available; accordingly, the selected anticipated ambient lighting is associated with the available rendering intent. For example, in a home photo printer 118 (FIG. 1), the user may be allowed to select between florescent and incandescent anticipated ambient lighting conditions. However, since photos appear more aesthetic when a perceptual rendering intent is applied, only the perceptual rendering intent is available.

At block 406, the user is allowed to select an anticipated ambient lighting, such as by operation of the second embodiment of the ambient lighting selector 209 (FIG. 2), as discussed above. Each ambient lighting is associated in a fixed manner—such as by the second embodiment of the rendering intent selector 211 (FIG. 2) discussed above—with an associated rendering intent. For example, where D50 ambient lighting is selected by the user, the colormetric rendering intent may be selected automatically by the rendering intent selector 211 as a result of a pre-association between each anticipated ambient lighting and an associated rendering intent.

At block 408, the user is allowed to select an anticipated ambient lighting and a desired rendering intent, such as by operation of the second embodiment of the ambient lighting selector 209, seen above, and the first embodiment of the rendering intent selector 211, seen above. By giving the user freedom to select both rendering intent and anticipated ambient lighting, the user is able to achieve results that might not be possible in other configurations.

At block 410, the user is allowed to select either a desired rendering intent or an anticipated ambient lighting. In some cases, the selected rendering intent or anticipated ambient lighting has been pre-associated with an anticipated ambient lighting or a rendering intent, respectively. In other cases, the user is free to additionally select an anticipated ambient lighting or a rendering intent, respectively. For example, selection either D50 ambient lighting or the colormetric rendering intent may imply selection of the other. However, a perceptual rendering intent may be selected, and additionally, an anticipated ambient lighting of either office lighting or incandescent lighting may be selected.

Figure 5:
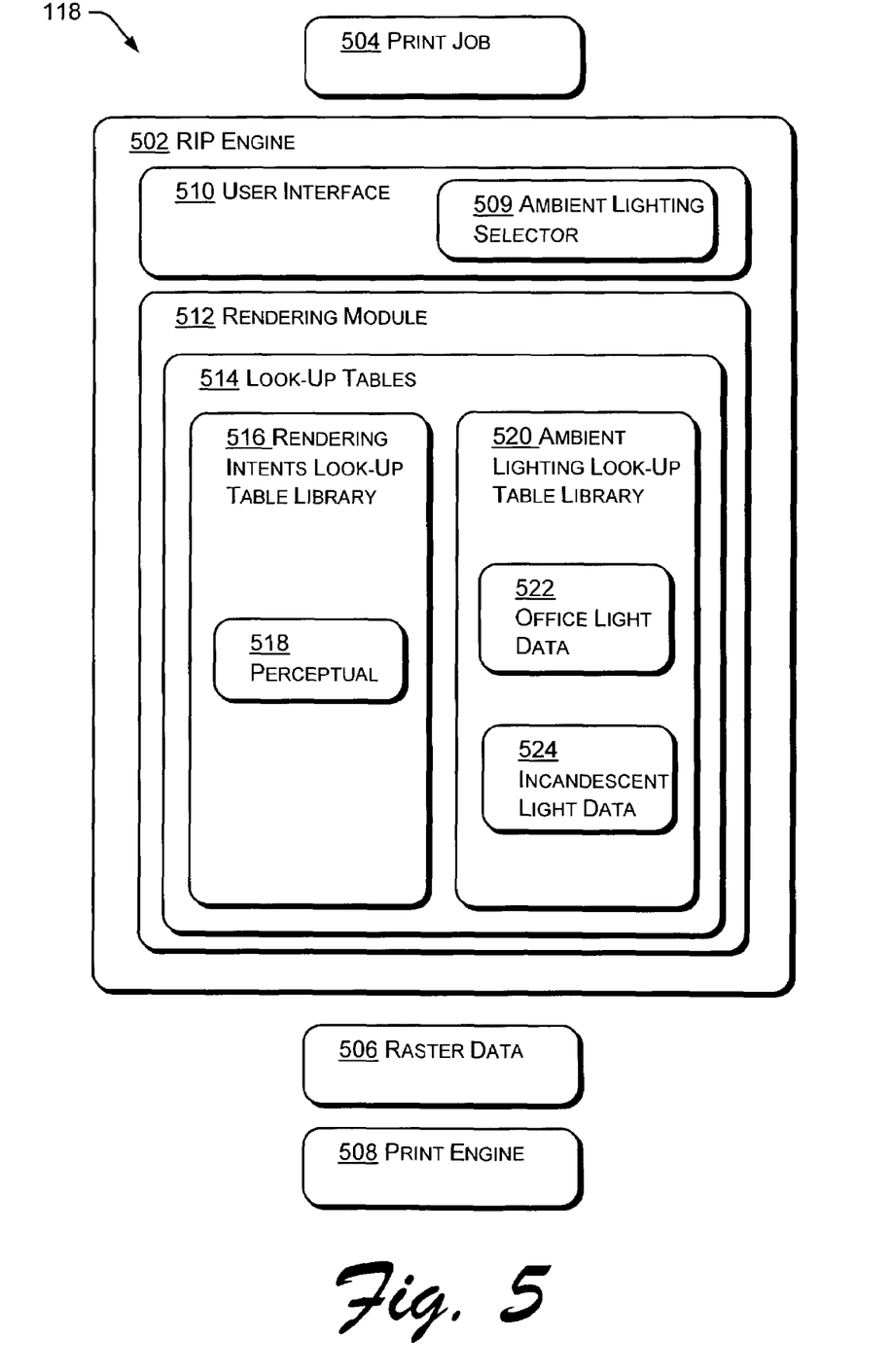
FIG. 5 is a block diagram that illustrates an exemplary system configured for printing photographs for viewing in selected ambient lighting conditions.

FIG. 5 shows an exemplary implementation of home photo printer 118 (FIG. 1). A RIP (raster image processing) engine 502 is configured to process a print job 504 to result in raster data 506 suitable to drive a print engine 508, thereby causing output of a photograph or other desired image. The RIP engine 502 may include a user interface 510, which provides an ambient lighting selector 509 configured to allow user selection of a desired ambient lighting. A rendering module 512 may be configured with look-up tables 514 including a rendering intents look-up table library 516 and an ambient lighting look-up table library 520. In a preferred embodiment, the home photo printer 118 includes only a perceptual rendering intent look-up table 518 within the rendering intents library 516. The perceptual rendering intent look-up table 518 is appropriate for use in the generation of color photographs, and is therefore best suited for the application. The ambient lighting look-up table library 520 may be configured with look-up tables associated with office lighting 522 and incandescent lighting 524, either of which may be selected by operation of the ambient lighting selector 509 within the user interface 510.

In operation, a user sending a print job 504 to the printer 118 would encounter the user interface 510. The ambient lighting selector 509 would allow selection of either the look-up tables associated with office lighting 522 or incandescent lighting 524. The rendering module 512 would then render the print job 504 using the perceptual rendering intent color look-up table 518 and the anticipated ambient lighting look-up table 522, 524 selected by the user. Raster data 506 would be generated for consumption by the print engine 508, which would generate output.

Although the disclosure has been described in language specific to structural features and/or methodological steps, it is to be understood that the appended claims are not limited to the specific features or steps described. Rather, the specific features and steps are exemplary forms of implementing this disclosure. For example, while, actions described in blocks of the flow diagrams may be performed in parallel with actions described in other blocks, the actions may occur in an alternate order, or may be distributed in a manner that associates actions with more than one other block. Additionally, the elements of the method may be performed by any desired means, such as by the execution of processor-readable instructions defined, encoded or otherwise written or contained on or by a processor-readable media, such as a disk, a ROM or other memory device, or by operation of an application specific integrated circuit (ASIC) or other means. And further, while reference has been made to various rendering intents, including colormetric, perceptual and saturation rendering intents, as well as various ambient lighting conditions including D50, office light and incandescent light, it is to be understood that these references are made for purposes of example only, and that other rendering intents and/or ambient lighting conditions could be added or substituted.

The invention claimed is:

1. A system, comprising:
   an anticipated ambient lighting selector to select an anticipated ambient lighting; and
   a rendering module to map input print data into output print data configured to reduce color cast in gray output when displayed under the anticipated ambient lighting, wherein the rendering module is configured to gradually reduce an extent to which gamut mapping intended to reduce the color cast of the gray output under the anticipated ambient lighting is applied to near gray output to smooth a transition between the gray and the near gray output.

2. The system of claim 1, wherein the anticipated ambient lighting selector displays a user interface to obtain the anticipated ambient lighting.

3. The system of claim 1, wherein the anticipated ambient lighting selector obtains the anticipated ambient lighting based pre-association with a selected rendering intent.

4. The system of claim 1, wherein the rendering module additionally comprises:
   a lookup table to map gray and near gray input data within the input print data into the output print data consistent with a reduction of color cast when viewed under the anticipated ambient lighting.

5. A method of printing, comprising:
   selecting an anticipated ambient lighting;
   reducing color cast seen in gray output displayed under the anticipated ambient lighting; and
   smoothing transitions between the gray output and near gray output by reducing gradually an extent to which gamut mapping intended to reduce color cast of the gray output under the anticipated ambient lighting is applied to the near gray output.

6. The method of claim 5, wherein the selecting comprises:
   allowing a user to select the anticipated ambient lighting from a user interface.

7. The method of claim 5, wherein the selecting comprises:
   selecting a desired rendering intent, wherein selecting the desired rendering intent results in automatic selection of the anticipated ambient lighting.

8. The method of claim 7, wherein reducing the color cast comprises:
   using a first color look-up table associated with the desired rendering intent; and
   using a second color look-up table to reduce the color cast in the gray 9. A print system, comprising:
   means for selecting an anticipated ambient lighting;
   means for reducing color cast in gray output caused by the anticipated ambient lighting; and
   means for reducing gradually an extent to which gamut mapping intended to reduce color cast caused by the anticipated ambient lighting is applied to near gray output.

10. The print system of claim 9, wherein the means for selecting comprises:

means for prompting a user to select the anticipated ambient lighting.

11. The print system of claim 9, wherein the means for selecting comprises:
   means for allowing a user selection of a desired rendering intent, wherein allowing the user selection of the desired rendering intent results in automatic selection of the anticipated ambient lighting.

12. The print system of claim 11, wherein the means for reducing the color cast comprises:
   means for using a first color look-up table associated with the desired rendering intent; and
   means for using a second color look-up table to reduce the color cast in the gray and near gray output.

13. A print system, comprising:
   data indicating an anticipated ambient lighting; and
   a rendering module to translate input print data into output print data according to the anticipated lighting, wherein gray output is neutralized to reduce color cast under the anticipated ambient lighting and wherein an extent to which near gray output is neutralized to reduce color cast caused by the anticipated lighting is reduced as a function of the chromatic content of the near gray output.

14. The print system of claim 13, additionally comprising:
   a selector, configured to base the anticipated ambient lighting on a selected rendering intent.

15. The print system of claim 13, additionally comprising:
   a selector, configured to base the anticipated ambient lighting on input from a user interface.

16. The print system of claim 13, additionally comprising:
   look-up tables in communication with the rendering module to map the input print data into the output print data, wherein a first look-up table is configured according to a selected rendering intent and a second look-up table is configured according to the anticipated ambient lighting.

17. A processor-readable medium comprising processor-executable instructions for:
   operating a user interface to allow user selection of a rendering intent;
   associating the selected rendering intent with an anticipated ambient lighting;
   raster image processing input print data to produce output print data wherein color cast in gray and near gray output is reduced when viewed in the anticipated ambient lighting;
   providing the output data to a print and
   accessing look-up tables, wherein a rendering intent look-up table is operated in association with an ambient lighting look-up table, and wherein the ambient lighting look-up table neutralizes the gray output to reduce color cast under the anticipated ambient lighting and wherein an extent to which the near gray output is neutralized to reduce color cast under the anticipated lighting is gradually reduced as a function of how chromatic the near gray output is.

18. The processor-readable medium as recited in claim 17, comprising additional instructions for:
   allowing for selection, through the user interface, of the rendering intent from a group of rendering intents comprising: colormetric, perceptual and saturation.

19. The processor-readable medium as recited in claim 17 wherein the rendering intent look-up table comprises perceptual rendering intent information, and where the ambient lighting look-up table comprises incandescent light information.

20. The processor-readable medium as recited in claim 17, wherein raster image processing the print job comprises additional instructions for:
   accessing at least one look-up table comprising rendering intent information and ambient lighting information.

* * * * *

UNITED STATES PATENT AND TRADEMARK OFFICE
CERTIFICATE OF CORRECTION

| | | |
|---|---|---|
| PATENT NO. | : 7,450,266 B2 | Page 1 of 1 |
| APPLICATION NO. | : 10/376447 | |
| DATED | : November 11, 2008 | |
| INVENTOR(S) | : Juan Uroz et al. | |

It is certified that error appears in the above-identified patent and that said Letters Patent is hereby corrected as shown below:

In column 1, line 58, insert -- FIG. 1 -- before "shows".

In column 8, line 32, in Claim 4, delete "lookup" and insert -- look-up --, therefor.

In column 8, line 57, in Claim 8, after "gray" insert -- output. --.

in column 10, line 11, in Claim 17, after "print" insert -- engine; --.

In column 10, line 25, in Claim 18, delete "colormetric," and insert -- colorimetric, --, therefor.

In column 10, line 26, in Claim 19, after "claim 17" insert -- , --.

Signed and Sealed this

Twenty-third Day of February, 2010

David J. Kappos
*Director of the United States Patent and Trademark Office*